United States Patent [19]

Mims

[11] 4,353,067
[45] Oct. 5, 1982

[54] METHOD OF REDUCING SIDE LOBES OF COMPLEMENTARY CODED PULSES IN A COHERENT PULSE COMPRESSION DOPPLER RADAR RECEIVING SYSTEM

[75] Inventor: James H. Mims, Millersville, Md.

[73] Assignee: Westinghouse Electric Corp., Pittsburgh, Pa.

[21] Appl. No.: 182,390

[22] Filed: Aug. 29, 1980

[51] Int. Cl.³ ............................................. G01S 13/28
[52] U.S. Cl. ............................................ 343/17.2 PC
[58] Field of Search ................................ 343/17.2 PC

[56] References Cited

U.S. PATENT DOCUMENTS

| | | |
|---|---|---|
| 3,225,349 | 12/1965 | Thor . |
| 3,680,125 | 7/1972 | Goldstone . |
| 3,731,311 | 5/1973 | Williams . |
| 3,757,331 | 9/1973 | Moulton . |
| 3,866,223 | 2/1975 | Crooke . |
| 3,887,918 | 6/1975 | Bailey et al. . |
| 3,889,199 | 6/1975 | Gutleber . |
| 3,900,868 | 8/1975 | Bock et al. . |
| 3,945,010 | 3/1976 | Wardrop . |
| 3,945,011 | 3/1976 | Glasgow ..................... 343/17.2 PC |
| 3,976,998 | 8/1976 | Voles et al. . |
| 3,993,994 | 11/1976 | Goggins . |
| 4,005,417 | 1/1977 | Collins . |
| 4,012,627 | 3/1977 | Antoniak . |
| 4,021,805 | 5/1977 | Effinger et al. . |
| 4,028,699 | 6/1977 | Stevens . |
| 4,028,700 | 6/1977 | Carey et al. . |
| 4,045,795 | 8/1977 | Fletcher et al. . |

OTHER PUBLICATIONS

Colin et al.; *Pulse Compression in Radars Using Binary Phase Modulation; Electrical Communication*, vol. 52, NR. 2, (1977), pp. 152–157.

*Primary Examiner*—T. H. Tubbesing
*Attorney, Agent, or Firm*—H. W. Patterson

[57] ABSTRACT

A method of processing doppler signal data to provide time and frequency (therefore phase) coincidence for complementary code pairs of a coherent, pulse compression radar using a weighting of every other echo pulse of a particular range cell to guarantee pulse compression sidelobe cancellation in accordance with complementary code theory.

3 Claims, 5 Drawing Figures

METHOD OF REDUCING SIDE LOBES OF COMPLEMENTARY CODED PULSES IN A COHERENT PULSE COMPRESSION DOPPLER RADAR RECEIVING SYSTEM

SUMMARY OF THE INVENTION

1. Field of the Invention

The present invention relates to radar and more particularly to a method of compensating for doppler shift of complementary coded signals of a coherent, pulse compression radar system.

2. Description of the Prior Art

In pulse compression radar systems, a relatively long coded pulse is transmitted, and the received echo pulse is processed to obtain a relatively narrow or short pulse. Such a system maintains the increased detection capability of the long pulse while retaining the range resolution capability of the short pulse.

In such systems, which are phase or frequency coded, each pulse is comprised of a series of subpulses which differ in phase in accordance with a particular code. The received pulses are decoded in what is commonly termed a matched filter, which provides a correlation of the received pulse with the transmitted pulse. The output of such matched filter consists of the compressed pulse accompanied by responses at other ranges, which are referred to as time or range side lobes.

For such pulses, a binary code is widely used where the phase of each subpulse alternates between 0 and 180°, and represents a series of 1's or 0's or plus 1's and minus 1's in accordance with a specific code. A special class of well-known codes, referred to as Barker codes, provide an optimum signal; but the maximum compression ratio of such codes is limited to thirteen. A well-known binary coded system that overcomes certain limitations of the Barker code is the Golay or complementary code pair wherein a pair of pulse sequences are binary coded to provide a special complementary property at their respective matched filter outputs. The codes themselves are not mutually complementary. Reference is made to a publication entitled "Complementary Series" published in April 1961 in IRE PGIT IT-7 pages 82-87 for a more detailed understanding thereof. Such codes overcome the side lobe problem in that the time sidelobes at the matched filter output of one of the complementary codes cancel corresponding time sidelobes at the matched filter output of the other complementary code, and provide correlation peaks which are additive. Thus, such code pairs provide for all time side lobes to vanish identically when the separate auto correlation functions of the pair are added. However, these complementary codes have been limited in their usefulness in many radar applications because of the fundamental problem of arranging effectively two separate time and frequency channels. Time coincidence is necessary in utilizing the complementary codes where target motion is involved, and frequency coincidence is necessary, to maintain phase coherence between the two channels. If such time and frequency coincidence is not maintained, the time side lobes of the two channels will not maintain the exact 180° phase relationship required for cancellation.

In the past, the method most often proposed is what may be termed, a pulse repetition frequency interlace, where each one of the pair of complementary codes are alternated during each interpulse period, decoded so that they are extended over the full observation time, and then summed to provide the output. However, the basic problem with such an arrangement is poor cancellation of the side lobes that is caused by the doppler phase shift during an interpulse period; or in other words, the time between each one of the complementary pairs. For example in referring to such prior art arrangement of FIG. 1, consider a 1 kilohertz pulse repetition frequency radar at X-band with at least a 2:1 range-doppler ambiguity latitude. In such an arrangement, the complementary code pairs which were transmitted alternately 500 microseconds apart, provided two 1 kilohertz pulse repetition frequencies, and are interlaced such that the transmit pulse repetition frequency is 2 kilohertz. With reference to FIG. 1, which illustrates the functional arrangement of a pulse compression radar having zero doppler phase shift, a receiver 10 receives each pair of complementary codes A and B in sequence as shown in FIG. 2. The pulse repetition frequency is illustrated as being at time T which is for example, 1 millisecond. A switch 11 is operated to alternate in a conventional manner back and forth between terminals 12 and 13 to apply every other pulse having a code A to a matched filter 14 and every intervening pulse, which is the complementary coded pulse B, to a matched filter 15. In order to obtain time coincidence, a delay line 16, delays each of the pulses containing code A, 500 microseconds in the present example. Thus, the alternate codes A and B that are received in sequence are summed each time that a code B pulse is applied to terminal 13 and the match filter 15 by a summing device 17. The point target response for the channel that includes the match filter 15 is illustrated by a curve generally referred to at 18. This curve illustrates the main lobe 20 having a higher value than the side lobes such as 21 and 22. The coded pulse of channel A which includes the filter 14 and the delay 16 generates an output represented generally by curve 23, that is the complement of the curve 20. Thus, as seen from FIG. 1, the summing of the two curves at 17 provides for cancelling the side lobe portions of the matched filter outputs identified as minus and plus 1, respectively, while adding the main central portion to provide a spike 24 at the output of the device 17 which is the result of adding the portion 20 and a portion 25 of the curves 18 and 23, respectively. However, where a system includes doppler shift, even though the time delay 16 of the one channel provides time coincidence, the variation in phase between successive pulses does not eliminate the side lobes. In an attempt to eliminate the time side lobe problem in connection with a coherent pulse compression radar system, it has previously been proposed to switch the odd and even pulse pairs of the complementary code to separate channels and then use a bank of doppler filters for each channel in order to provide time and phase coincidence. Such arrangement had limitations in that the combined outputs would still tend to have unsatisfactory side lobes unless the particular target, for the range concerned, provided a doppler frequency that corresponded to the center frequency of the doppler filter. Also, each of the two channels required the inclusion of the doppler filter banks.

Thus, it is desirable to provide a method of receiving complementary coded pulse pairs for a coherent pulse compression radar system that minimizes the side lobes and accommodates doppler frequency shifts of the pulses without the disadvantages of the prior art.

SUMMARY OF THE INVENTION

In accordance with the present invention, there is provided a method of receiving sequentially applied radar echo pulses that are alternately switched for application to two distinct processing channels so that each coded pulse pair is separately processed. In each channel, the alternate pulses are compressed and then applied to a conventional corner turn memory, for example, to provide a train of pulses at the output of such memory that are processed in sequence in accordance with a particular range of the system. In one of the channels, the alternate pulses are subjected to weighting in order to provide an output that corresponds to such doppler waveform at a sample time that would coincide with the next succeeding pulse of the complementary pulse pair. The same is accomplished for each range sample. In order to obtain the desired accuracy, a predetermined number of preceding alternate pulses of code A are weighted and combined with the current pulse for combining with the other channel B. In this connection, the other channel, B, to which is applied the B coded pulses is delayed for a lesser number of preceding pulses so as to be in time coincidence with the control time position of the weighted pulses of the first channel. The weighting of the first channel is chosen to provide an interpolated value of the doppler waveform at the central time position of the weighted pulses. Thus, the doppler phase difference between the two channels is zero because of this time coincidence for any doppler frequency.

DESCRIPTION OF THE PREFERRED EMBODIMENT

Figure 1:
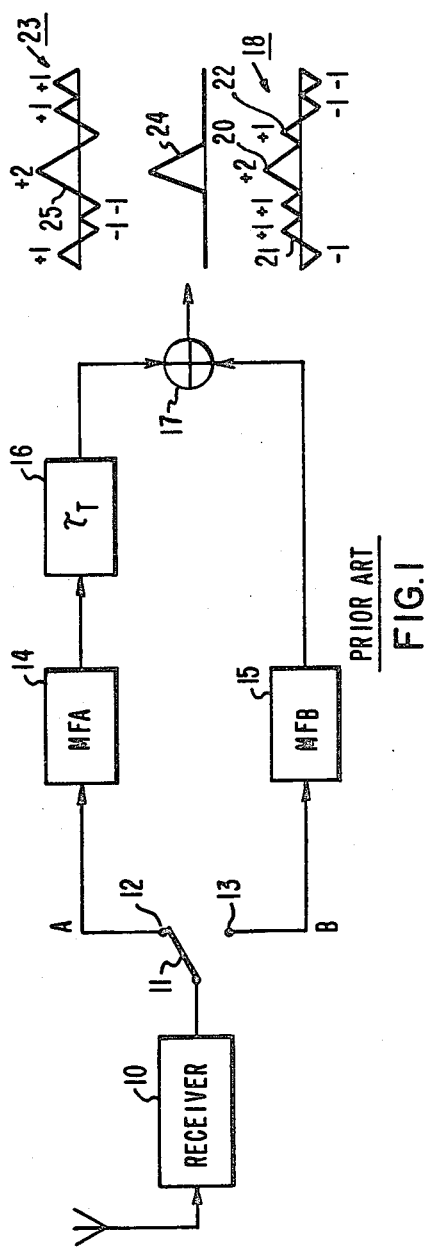
FIG. 1 is a broad block diagram together with waveforms to illustrate the low side lobe performance of complementary codes in a pulse compression system in a zero doppler shift environment.
Figure 2:
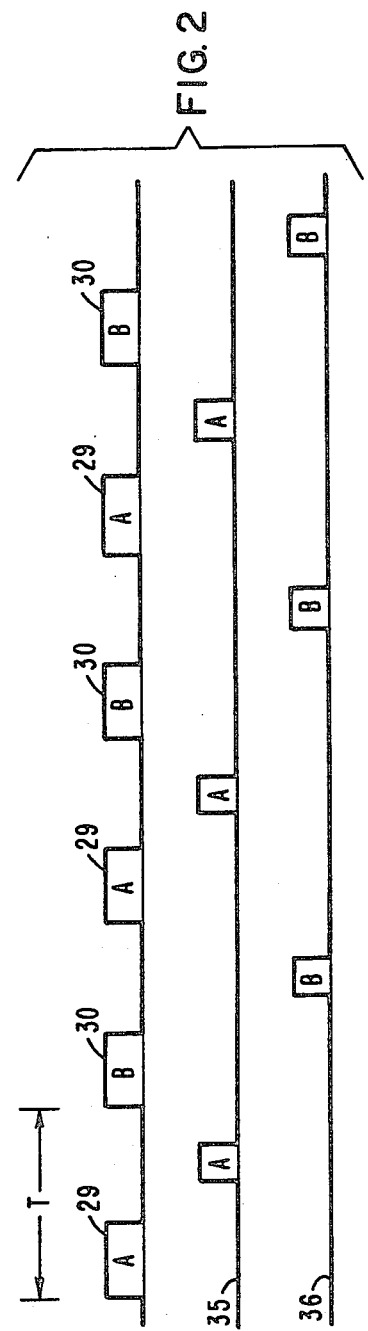
FIG. 2 is a diagram to illustrate the train of complementary pulse pairs that are received by the system for a particular range illustrating the alternate switching of alternate ones of the pulse pairs to individual channels.
Figure 3:
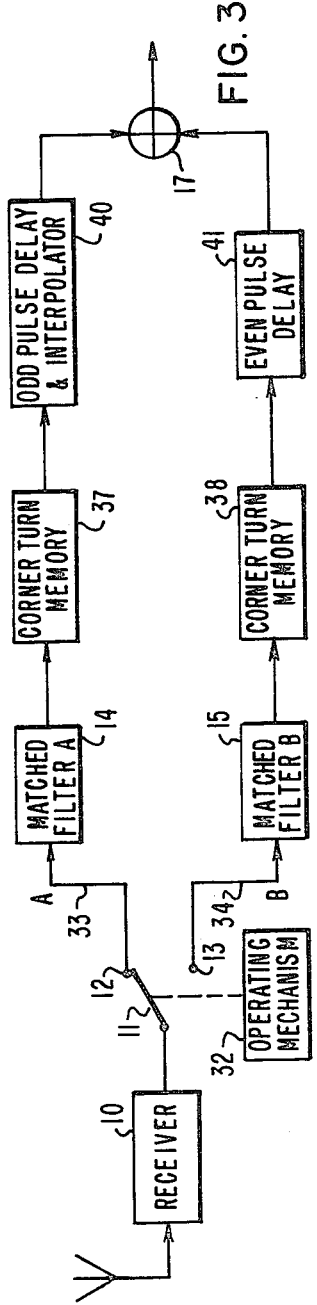
FIG. 3 is a block diagram to illustrate broadly a system for practicing the method of the present invention.

Referring to FIG. 3, wherein the same reference numerals are used to designate portions of FIG. 1 that have similar functions, includes the receiver 10 for receiving coded pulse pairs A and B, which are referred to in FIG. 2 as 29 and 30, respectively. These pulses which bear the odd number 29 may be referred to as the odd numbered pulses and the pulses referred to as 30 may be referred to as the even numbered pulses herein, and in some instances will be designated as having a code A or a code B, respectively. The switch 11 illustrates a conventional switch operating mechanism 32 that may be operated in any conventional manner to apply the pulses 29 to input 33 by way of a contact 12 to the matched filter 14. Similarly, the switch 11 is operated to apply the pulses 30 to input 34 of the matched filter 15. It is assumed that the switch 11 and mechanism 32 may be any type of electronic switching apparatus that functions to apply such pulses to the respective channels A and B alternatively subsequent to the transmission of the correspondingly encoded pulse A or its complement pulse B. In other words, upon completion of transmission of the pulse A, the switch 11 is in the functional position as shown in the drawings to receive an echo during an interpulse period prior to the commencement of transmission of the next succeeding pulse B. Likewise, upon the completion of transmission of the pulse B, the switch 11 is in functional contact with point 13 to apply any echoes from the encoded pulses B to the matched filter 15.

Thus, as shown in FIG. 2, at lines 35 and 36, respectively, every other pulse, or the odd numbered pulses A are applied to channel A, and the even numbered pulses B, or in other words every intervening pulse, is applied to channel B. The matched filters 14 and 15 may be of any conventional type and have filter characteristics matched to the pulse waveform similar to that in the prior art. The outputs of the matched filters 14 and 15 are applied to corner turn memories 37 and 38 that function to read in the received echoes in the sequence in which they are received and to read out such echo pulses in sequence for a particular range. In other words, the memories 37 and 38 read out such pulses in what may be termed, a range sequence. The delay portions of a function referred to as odd pulse delay and interpolator 40, and even pulse delay 41 function to effect summation of a pulse previously received of channel B with a weighted sum of both preceding and succeeding pulses thereto of channel A.

Figure 4:
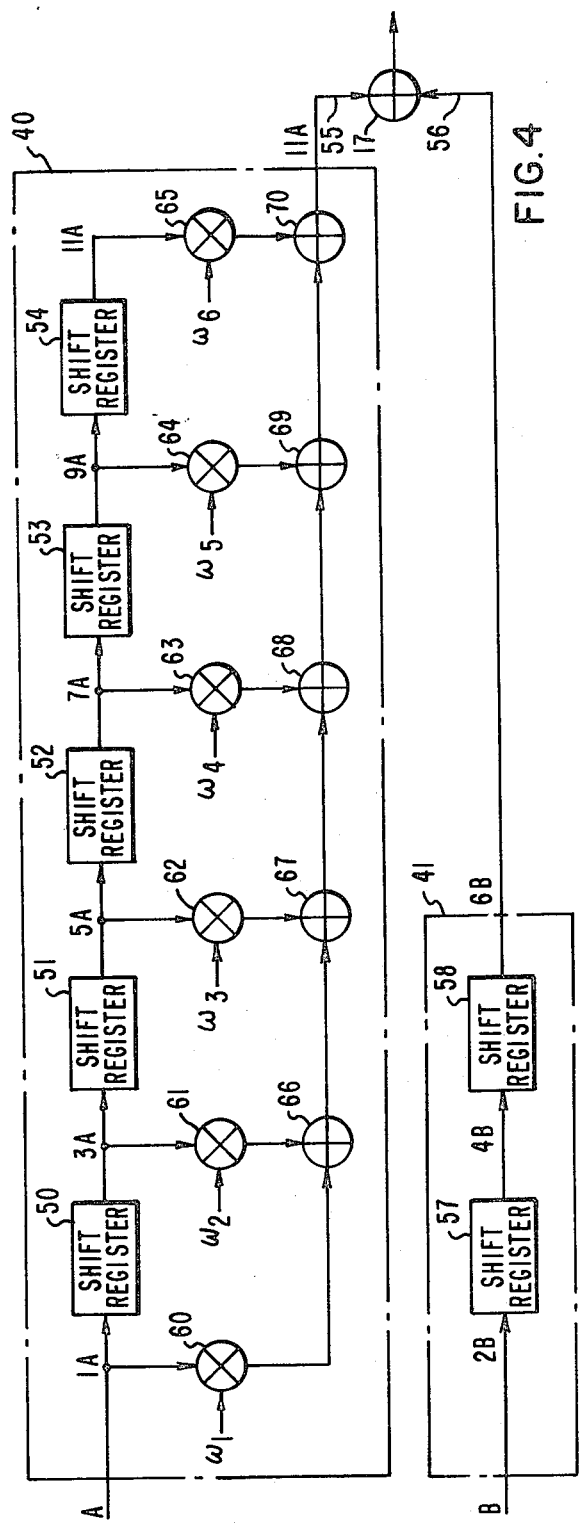
FIG. 4 is a block diagram to illustrate in more detail the function of the odd pulse delay and interpolator of FIG. 3 together with the even pulse delay of such figure in carrying out the method of the present invention.

Referring to FIG. 4, the odd pulse delay and interpolator 40 together with the even pulse delay 41 includes a plurality of shift registers for delaying the pulses in channel A and channel B such that there is time coincidence of the complementary pairs of the pulses A and B at the outputs of the devices 40 and 41. Although a "pipeline" diagram of the delay and interpolation function having shift registers is illustrated in FIG. 4 to provide clarity in understanding the method of the present invention, a preferred implementation would involve a programmable type structure to accomplish the same function. The odd coded pulses A are applied to delay devices such as shift registers 50, 51, 52, 53, and 54 to store a train of alternate or odd pulses applied to channel A of the same range cell of the system. These devices serve to provide a cumulative delay such that as each pulse appears on output line 55, it is in time coincidence with an even or B pulse on line 56.

It should be mentioned that in an analog or digital shift register mechanization, the clocking of the range sample in channel B must be delayed one IPP (500 microseconds) to be in readout coinciding with channel A. Likewise, an analog delay of 500 microseconds would have to be inserted in channel B for the analog version. In a programmable digital arrangement such delay would not be applicable since all the required data resides in a random access memory.

Each of the pulses 3A through 11A are weighted at the outputs of their respective shift registers 50 through 54 along with the current pulses 1A that is weighted but undelayed. Such weighting is shown schematically to occur at respective multiplying devices 60 through 65 to which may be applied weights $\omega_1$ through $\omega_6$ respectively. Such weighted current received echo pulse 1A together with the weighted preceding odd pulses 3A through 11A are summed at summing devices 66 through 70 inclusive to provide the resultant time coincident and doppler phase shift coincident pulse with respect to the output of the function 41 of channel B for subsequent summing. The particular weight sets that are applied may be readily ascertained by reference to equation 4 on page 20 of an article entitled "Linear Interpolation Extrapolation And Prediction Of Random Spaced Time Fields With A Limited Domain of Measurement" by D. P. Peterson published in the Transactions of Information Theory on the I.E.E.E. in January of 1965, which is incorporated herein. In such equation, the weights would be obtained by solving for G therein.

Figure 5:
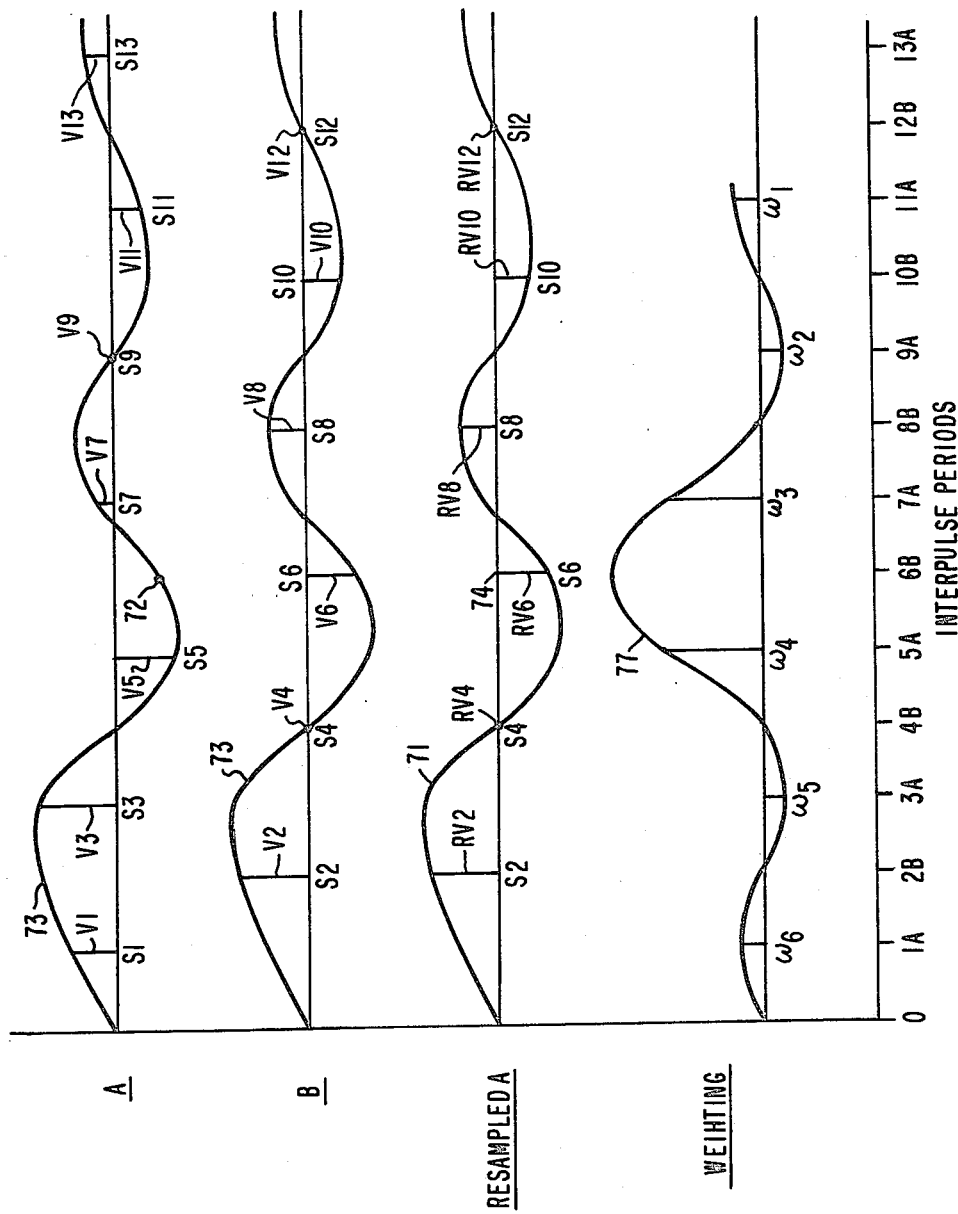
FIG. 5 is a graphical representation illustrating the doppler waveform of a moving target at a particular range which is sampled by the radar by the train of alternate pulses on each of the two channels together with the application of the weights that may be applied to one of the channels and the resulting doppler waveform at the output of such channel.

Referring to FIG. 5, the convolution of the interpolator weight set $\omega_1$ through $\omega_6$ is illustrated at the interpulse period (IPP) 77 which corresponds to the output of summation device 70 of FIG. 4. The odd pulse delay and interpolator 40 is illustrated as operating on six consecutive interpulse period sample echoes in channel A for each range cell. The weight set $\omega_1$ through $\omega_6$ is chosen to provide a least mean square error estimate of a waveform 73 (FIG. 5) at the time instant intermediate between the pulse samples S5 and S7 such as noted by point 72 of waveform 73. The point 72 as noted in FIG. 5 corresponds to the interpulse period 6B. Thus, as shown in FIG. 5, a delay of two interpulse periods in channel B brings the echo pulse during interpulse period 6B for the same range into exact coincidence with the echo pulse with point 74 of the waveform 71. Thus, the time coincidence of the echo pulses for a particular range is brought into time coincidence by the relative delays of the pulses and phase coincidence by the application of the weight sets as previously described. Thus, in the preferred method, at least six consecutive echo pulses in channel A, one of which is the current echo pulse, are weighted such that the echo pulse for the particular range cell in interpulse period 6B is compared against a weighted set of pulses in channel A that include the three preceding odd pulses and three succeeding odd pulses. More or less interpolations may be utilized depending upon the desired degree of accuracy. This storing of six doppler samples, for example, for each range cell permits an accurate interpolation of the data from one channel so as to be in time coincidence with the data in the other channel. In effect, the interpolation as provided by the weight set herein is equivalent to a physical displacement of the interpolated channel along the flight pattern, thus the channels A and B have equivalent physical receiving points. As shown in the following equation, the delay T is zero resulting in total cancellation of time side lobes independent of the signal doppler frequency. Such equation shows the normalized mean square redisual time side lobe error.

$$\epsilon_{tsl} \approx \frac{1}{N} (1 - \cos \omega_D T)$$

where $\omega_D$ is the target doppler frequency. Further, if it is assumed that 75% of the basic 1 kilohertz pulse repetition frequency (PRF) is usable, then the maximum usable doppler is ±375 hertz. Using the above equation, the mean square integrated time sidelobe level becomes $$\epsilon_{Tsl} = \frac{1}{N} (1 - \cos [2\pi.375\ 0.0005]) = \frac{.61}{N}$$

therefore, $$\epsilon_{Isl} = N\epsilon_{tsl} = 0.61 \text{ or } -2db$$

Such an error, which is generally unacceptable for most radar systems, is overcome in accordance with the previously described method. It should be noted, that the above equation is valid providing that $\omega_D T_P$ is less than 1 where $T_P$ is the transmit pulse duration. It is further noted, that although digital signal processing may be preferable in implementing the method of the present invention, it is possible in principle to use discrete analog technology such as charge transfer devices.

With further reference to FIG. 5, the curve 73 illustrates the typical doppler frequency of a waveform and illustrates the sampling of each of the odd pulses S1 through S13 with their appropriate values given by the length of associated vertical lines referred to as V1, V3, V5 through V13. Simlarly, the sampling values in channel B which occur during the appropriate interpulse periods are referred to V2, V4 (which is zero in the present example), V6 through V12. It is further noted that such waveform is out of coincidence with respect to the complementary pairs of odd and even pulses. A typical set of weights is illustrated by vertical lines $\omega_1$ through $\omega_6$ which are connected by a curve 77. The result of such weighting as previously described provides an output in the A channel in time coincidence with the echo samples of the B channel as illustrated by vertical lines RV2, RV4, RV6, RV8, RV10, and RV12. It is noted that as a result of the weighting the sampling times RV4 and RV12 of the curve 71 are zero. Thus, as noted in FIG. 5 as a result of the weighting the doppler shifted waveform 58 of the even pulses of channel B is substantially in phase with the interpolated and resampled pulses of channel A as shown by the waveform 71.

Once the method of the present invention has been taught to one skilled in the art in accordance with the description herein, many ways of implementing the method other than described herein will become apparent. The functional diagrams that are utilized in describing the present invention have been selected in order to provide a concise description thereof. However, in carrying out the present invention, it is contemplated that digital techniques or even discrete analog techniques would be utilized. For example, instead of utilizing shift registers as hereinafter described in connection with the particular delay aspects of the method, it is contemplated that they would be constructed digitally where a random access memory would be programmed in a digital signal processor. Also, such a method could be carried out utilizing surface acoustic delay lines, or charge coupled devices (CCD's), or other integrated circuits, or any other apparatus well known to those skilled in the art in accordance with the particular application involved.

I claim:

1. A method of receiving sequentially applied radar pulses, alternate ones of which are phase encoded with intervening pulses of a complementary code, comprising switching alternate ones of each of the pulses to provide a first channel for each of the pulses encoded with one of the coomplementary codes and to provide a second channel for each of the pulses encoded with the other of the complementary codes; correlating the pulses in each individual channel to provide a separate matched output for each of the complementary codes; weighting each of the pulses in said first channel to provide a replica substantially corresponding to the amplitude and phase of a predetermined pulse in the second channel, delaying the pulses in the second channel to provide time coincidence with the weighted replicas of the first channel, and combining the weighted replicas of said first channel with pulses of said second channel.

2. A method according to claim 1 wherein the predetermined pulse in the second channel is combined with the weighted sum of a predetermined plurality of preceding and succeeding pulses in the weighted channel.

3. A method according to claim 1 wherein the predetermined pulse in the second channel is combined with the weighted sum of at least six alternate echo pulses of said weighted channel.

* * * * *